US007101602B2

(12) United States Patent
Althöfer et al.

(10) Patent No.: US 7,101,602 B2
(45) Date of Patent: Sep. 5, 2006

(54) SHEET-METAL FOIL WITH SLIDING STRUCTURE, HONEYCOMB BODY AND PROCESS FOR PRODUCING THE SAME

(75) Inventors: Kait Althöfer, Wiehl (DE); Jan Hodgson, Troisdorf (DE); Michael Voit, Leverkusen (DE); Ferdi Kurth, Mechernich (DE)

(73) Assignee: Emitec Gesellschaft fuer Emissionstechnologie mbH, Lomar (DE)

( * ) Notice: Subject to any disclaimer, the term of this patent is extended or adjusted under 35 U.S.C. 154(b) by 113 days.

(21) Appl. No.: 10/704,257

(22) Filed: Nov. 7, 2003

(65) Prior Publication Data

US 2004/0096689 A1 May 20, 2004

Related U.S. Application Data

(63) Continuation of application No. PCT/EP02/04947, filed on May 6, 2002.

(30) Foreign Application Priority Data

May 7, 2001 (DE) ................................ 101 22 082

(51) Int. Cl.
  *B32B 3/12* (2006.01)
(52) U.S. Cl. ...................... 428/116; 428/593
(58) Field of Classification Search ................ 428/116, 428/593, 134; 228/181; 422/179, 180, 181
See application file for complete search history.

(56) References Cited

U.S. PATENT DOCUMENTS

| | | | |
|---|---|---|---|
| 3,479,731 A * | 11/1969 | Mantel et al. | ............... 228/182 |
| 3,903,959 A * | 9/1975 | Fushimi et al. | ................ 165/9 |
| 4,318,888 A * | 3/1982 | Chapman et al. | ........... 422/180 |
| 4,381,590 A * | 5/1983 | Nonnenmann et al. | ........ 29/890 |
| 4,795,615 A * | 1/1989 | Cyron et al. | ................. 422/179 |
| 4,923,109 A * | 5/1990 | Cyron | ......................... 228/181 |
| 5,431,330 A | 7/1995 | Wieres | |
| 5,506,028 A | 4/1996 | Brück | |
| 5,846,495 A * | 12/1998 | Whittenberger et al. | ..... 422/180 |
| 6,036,926 A | 3/2000 | Wieres | |
| 6,371,360 B1 * | 4/2002 | Maus et al. | .................. 228/181 |
| 2002/0152614 A1 | 10/2002 | Kurth et al. | |
| 2003/0086838 A1 | 5/2003 | Bruck et al. | |

FOREIGN PATENT DOCUMENTS

| | | |
|---|---|---|
| DE | 199 43 878 A1 | 3/2001 |
| EP | 0 136 515 A2 | 4/1985 |
| EP | 0 434 539 A1 | 6/1991 |
| WO | 01/94761 A1 | 12/2001 |

* cited by examiner

*Primary Examiner*—Jennifer C. McNeil
*Assistant Examiner*—Daniel Miller
(74) *Attorney, Agent, or Firm*—Laurence A. Greenberg; Werner H. Stemer; Ralph E. Locher

(57) ABSTRACT

A honeycomb body has sheet-metal layers and sheet-metal foils to be joined with brazing powder. Each of the foils has at least one sliding structure enabling the adjacent layers to slide over one another. A honeycomb body, particularly a catalyst carrier body for an exhaust system of an internal combustion engine, includes at least partially structured sheet-metal layers wound and/or stacked to form passages for fluid flow. The sheet-metal layers are at least partially joined to one another by the brazing powder. The honeycomb body also has at least one sheet-metal foil with at least one sliding structure. A process for producing the honeycomb body guarantees sharply delineated brazed joints, even for brazing powder, which results in a greatly increased lifespan, particularly with regard to thermal and dynamic loads placed on the honeycomb body when used as a catalyst carrier body in an exhaust system of an internal combustion engine.

21 Claims, 4 Drawing Sheets

SHEET-METAL FOIL WITH SLIDING STRUCTURE, HONEYCOMB BODY AND PROCESS FOR PRODUCING THE SAME

CROSS-REFERENCE TO RELATED APPLICATION

This application is a continuation of copending International Application No. PCT/EP02/04947, filed May 6, 2002, which designated the United States and was not published in English.

BACKGROUND OF THE INVENTION

Field of the Invention

The present invention relates to a sheet-metal foil for a metallic honeycomb body which includes sheet-metal layers and a plurality of the sheet-metal foils being joined to form the honeycomb body by using a brazing material in powder form. The invention also relates to a honeycomb body, in particular as a catalyst carrier body in an exhaust system of an internal combustion engine, which includes at least partially structured sheet-metal layers that are wound and/or stacked in such a way as to form passages through which a fluid can flow. The sheet-metal layers are at least partially joined to one another through the use of a brazing material in powder form. The invention further relates to a process for producing a honeycomb body.

The use of metallic honeycomb bodies which have a plurality of sheet-metal foils that are wound and/or stacked to form the honeycomb structure is known, in particular, in the form of a catalyst carrier body in exhaust systems of spark-ignition or diesel engines used in the automotive industry. The sheet-metal foils are joined to one another using a brazing material in order to ensure structural integrity of the honeycomb body even under the thermal and dynamic loads which are encountered in an exhaust system. In addition to brazing material in wire form or ribbon form, it is also possible for brazing material in powder form to be used as the brazing material.

In order to ensure long-term functionality of the honeycomb body, fixing of the metallic honeycomb body in the exhaust system must be such that the components of the honeycomb body are permitted to undergo different degrees of thermal expansion, if necessary. That is especially important in particular with a view toward the sheet-metal foils being joined to a tubular casing which surrounds the honeycomb body. For that purpose it is known, for example, for the honeycomb body to be joined to the tubular casing only in an axial sub-region which is preferably disposed over an area of 20 mm, starting from the exhaust-gas inlet side. In that way, a relative movement between the sheet-metal foils, which heat up quickly and cool down quickly, and the tubular casing, is ensured in the sub-regions in which the honeycomb body is not joined to the tubular casing, and the occurrence of thermal stresses is prevented. In that context, it is particularly important for it to be possible to accurately comply with the desired limits with regard to the joining region during the production process. That does not present major problems when using brazing material in wire or ribbon form, which ensures that the brazing material is held together to a certain degree.

However, if the production process using brazing material in powder form is considered, it has not heretofore been possible to ensure a tightly delimited and defined area of use with a sufficient degree of process reliability, in particular for series or mass production. The fundamental reason therefor is in particular that before the sheet-metal foils are wound and/or stacked, an adhesive which is used to fix the brazing material in powder form is applied in the joining region. In particular during the operation of winding the sheet-metal foils, the adhesive becomes locally smeared and/or winding or stacking errors occur due to the significantly increased friction caused by the adhesive. The result of such smearing and/or errors is that brazing material sticks in areas of the honeycomb body where such sticking is undesirable, in particular including outside the joining region which has previously been defined.

SUMMARY OF THE INVENTION

It is accordingly an object of the invention to provide a sheet-metal foil for a metallic honeycomb body having sheet-metal layers, which is suitable for the production of a honeycomb body with a defined joining region, a honeycomb body and a process for producing the same, in which process reliability with regard to formation of joins in a predetermined joining region between the sheet-metal foils of the honeycomb body is considerably increased, all of which overcome the hereinafore-mentioned disadvantages of the heretofore-known products and processes of this general type, particularly with regard to elimination of the above-mentioned manufacturing technology problems.

With the foregoing and other objects in view there is provided, in accordance with the invention, in a metallic honeycomb body having sheet-metal layers, a plurality of sheet-metal foils to be joined using a brazing material in powder form to form the honeycomb body. Each of the sheet-metal foils comprises at least one sliding structure enabling the adjacent sheet-metal layers to slide over one another.

This sheet-metal foil is used in particular to produce a honeycomb body, with a plurality of sheet-metal foils of this type being joined using a brazing material in powder form. With regard to the distinction which is drawn between sheet-metal foil and sheet-metal layer, it should be noted that sheet-metal layers include sheet-metal foils with and/or without sliding structures and therefore form a type of precursor.

In accordance with another feature of the invention, the sliding structures are constructed, for example, as elevations in the form of bars and/or studs on the sheet-metal foil, with a predeterminable distance between the adjacent sheet-metal layers being ensured. Since the adjacent sheet-metal foils are in contact with one another substantially by the at least one sliding structure, the sheet-metal layers are prevented from sliding over one another over a large surface area. This causes the frictional forces which occur during the winding and/or stacking operation to be considerably reduced, in particular with regard to sheet-metal foils which have already been provided with adhesive. The result of this is, for example, that in terms of the operation of winding and/or stacking the sheet-metal foils, the forces which are required to form a honeycomb body can be reduced. In addition, smearing of the adhesive which has already been applied is prevented by this measure.

In accordance with a further feature of the invention, there is provided at least one sliding structure to delimit a joining region for attaching at least one adjacent sheet-metal layer. The at least one sliding structure preferably has a structure height of at most 0.07 mm, in particular even a structure height of less than 0.05 mm. Delimiting the joining region through the use of the at least one sliding structure results in the formation of a type of reservoir of adhesive and/or brazing material, preventing joins from being formed beyond the desired joining region. The precise structure height is to be selected in this case while taking the brazing material which is to be used, in particular its mean grain diameter, into account. A further consideration is the prevention of significant structural reinforcing of the sheet-metal foil which, for example, could impede a subsequent winding operation.

In accordance with an added feature of the invention, the at least one sliding structure is disposed close to an end side, preferably within a distance of 10 mm, in particular 5 mm, from the end side. In view of the fact that the end sides of the sheet-metal foils ultimately form an end face of the honeycomb body, a corresponding configuration of the at least one sliding structure allows the sheet-metal foils to be joined to one another close to a gas inlet side if the honeycomb body being formed is used in the exhaust system of an internal combustion engine. The highest thermal loads usually occur on this gas inlet side, meaning that a defined join is of particular importance at this location.

In accordance with an additional feature of the invention, the at least one sliding structure extends continuously over a width of the sheet-metal foil, preferably approximately parallel to the end side. In this way, it is possible, if appropriate, to delimit the joining region without any gaps in a disk-like region of the honeycomb body close to the gap inlet side. In this case, the sliding structures in this "disk" also have a slight reinforcing action, so that even sheet-metal foils with a thickness of less than 0.08 mm or even less than 0.05 mm, in particular less than 0.03 mm, can be used even in exhaust-gas purification systems which are subject to high dynamic loads.

In accordance with yet another feature of the invention, the at least one sliding structure is constructed in the form of studs. A stud-like form of the sliding structure means that it does not extend continuously over a width of the sheet-metal foil. The formation of a stud-like sliding structure is particularly advantageous with regard to the pressure loss which is brought about by the formation of the sliding structure. This pressure loss is lower with stud-like sliding structures than with sliding structures which extend over a width of the sheet-metal foil.

In accordance with yet a further feature of the invention, the sliding structure has a sliding surface which, with respect to sliding against the adjacent sheet-metal layer made from the same material, has a coefficient of sliding friction which is less than 0.15, in particular less than 0.1. In this context, it is particularly advantageous for at least the sliding surface to be provided with a lubricant. The embodiment of the sliding surfaces with a low coefficient of sliding friction of this nature or with a corresponding lubricant ensures that the winding operation takes place without disruption and/or that adjacent sheet-metal layers can slide over one another without being impeded.

With the objects of the invention in view, there is also provided a honeycomb body, in particular a catalyst carrier body for an exhaust system of an internal combustion engine. The honeycomb body comprises at least partially structured sheet-metal layers being wound and/or stacked to form passages through which a fluid can flow. The sheet-metal layers are at least partially joined to one another by a brazing material in powder form. At least one sheet-metal foil has at least one sliding structure as described above.

In accordance with another feature of the invention, in this context, it is particularly advantageous for the at least one sliding structure of sheet-metal foils disposed adjacent one another to be disposed at approximately the same axial distance from an end face of the honeycomb body. This leads in particular to a sharply defined joining region which is parallel to the end face of the honeycomb body and is in disk form. The result of this is that the thermal expansion or contraction of the honeycomb body caused by fluctuating thermal loads can be accurately predetermined, and the join can be constructed in such a way that structural integrity of the honeycomb body is ensured over a prolonged period of time.

In accordance with a further feature of the invention, the sliding structures of each two directly adjacent sheet-metal foils are constructed to face one another. The result of this is that the sliding structures of the two adjacent foils are disposed directly on top of one another and at least in part form a type of reservoir for fixing the brazing material in powder form. This has the advantage of permitting the structure height of the sliding structures to be reduced, since the structure heights of adjacent sheet-metal foils are ultimately cumulative. In this context, it may also be advantageous for the sheet-metal foils to each have bidirectional sliding structures and/or sliding structures which extend in different directions. Consequently, the advantageous sliding friction properties of the sheet-metal foil are ensured with respect to all adjacent sheet-metal foils, and reservoirs of brazing material and/or adhesive are formed on both sides.

With the objects of the invention in view, there is additionally provided a process for producing a honeycomb body, in particularly as described above, which comprises producing smooth and structured sheet-metal layers and/or sheet-metal foils having at least one sliding structure delimiting a joining region for attaching at least one adjacent sheet-metal layer and/or sheet-metal foil. An adhesive is applied in the joining region delimited by the sliding structure. The sheet-metal layers and/or sheet-metal foils are stacked and/or wound to form a honeycomb body. The honeycomb body is brazed by using a brazing material in powder form being fixed in the joining region by the adhesive. The honeycomb body is heated to produce brazed joints between the sheet-metal layers and/or sheet-metal foils.

In accordance with a concomitant mode of the invention, all of the smooth and structured sheet-metal layers are constructed as sheet-metal foils with at least one sliding structure. This reduces the forces which are required to stack and/or wind the sheet-metal layers. This also prevents smearing of the lubricant, with a sharply defined joining region being formed. Accordingly, joining regions which, in terms of the way in which they are delimited from remaining areas of the honeycomb body, are just as accurate as, for example, when brazing material in wire form or ribbon form is used, can be achieved even when using a brazing material in powder form.

Other features which are considered as characteristic for the invention are set forth in the appended claims.

Although the invention is illustrated and described herein as embodied in a sheet-metal foil with a sliding structure, a honeycomb body and a process for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
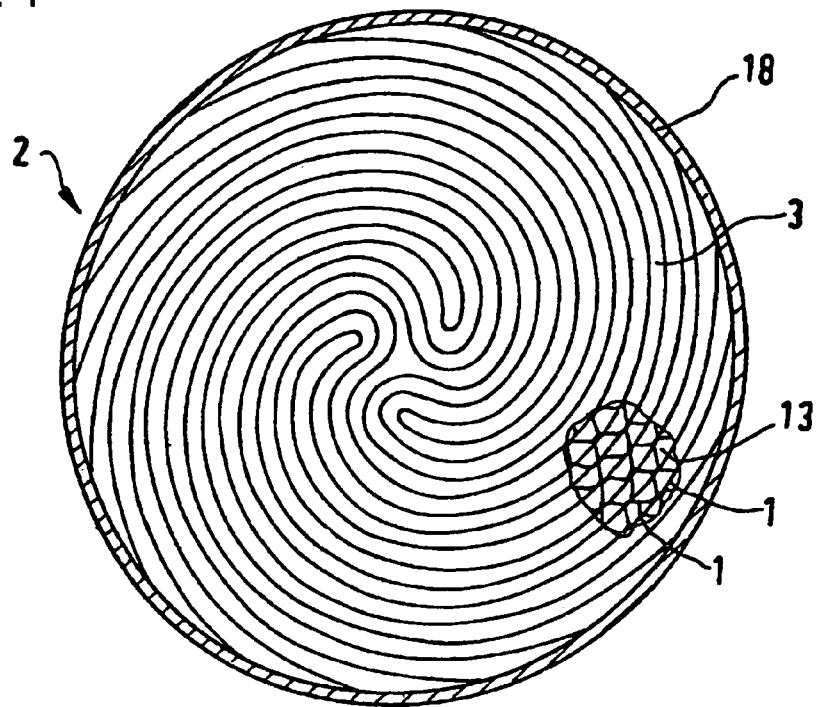
FIG. 1 is a diagrammatic and partly sectional front-elevational view of a metallic honeycomb body.

Referring now to the figures of the drawings in detail and first, particularly, to FIG. 1 thereof, there is seen a diagrammatically illustrated and partly sectional front-elevational view of a metallic honeycomb body 2 which includes at least partially structured sheet-metal layers 3 that are wound and/or stacked in such a way that they form passages 13 through which a fluid can flow. The sheet-metal layers 3 include corrugated and smooth sheet-metal foils 1 which are surrounded by a tubular casing 18. A honeycomb body 2 of this type is used in particular as a catalyst carrier body in an exhaust system of an internal combustion engine used in an automobile.

Figure 2:
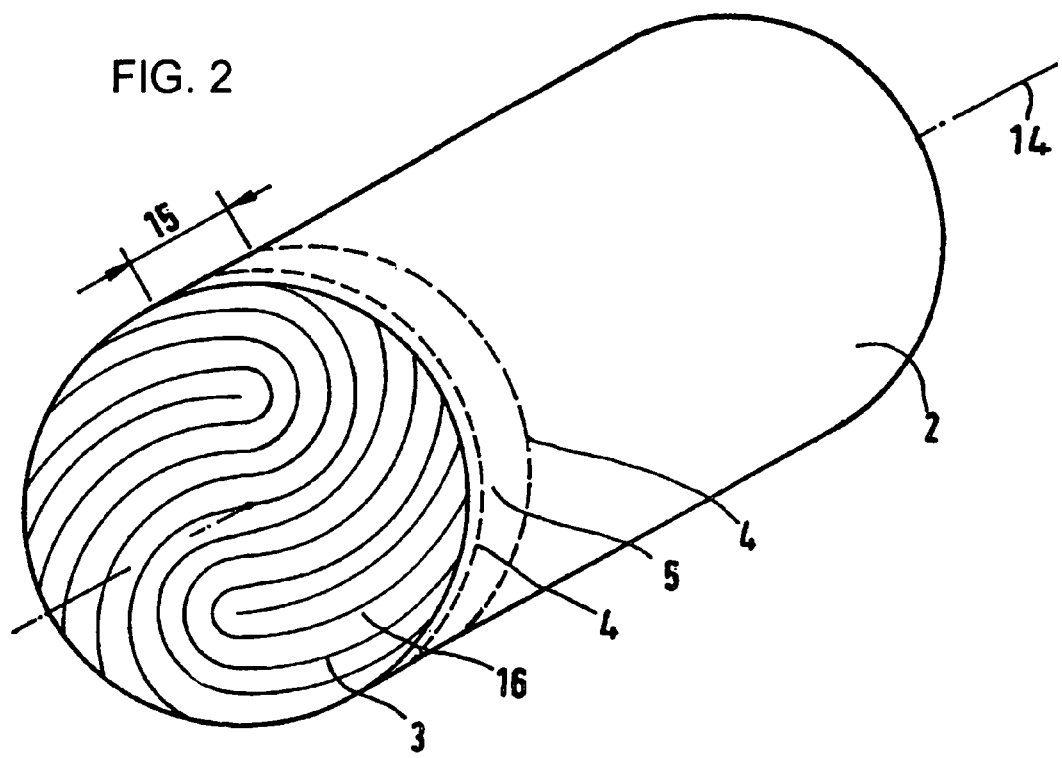
FIG. 2 is a perspective view of a further embodiment of a metallic honeycomb body.

FIG. 2 shows a diagrammatic and perspective illustration of a further embodiment of a honeycomb body 2 including at least partially structured sheet-metal layers 3. In order to produce the illustrated honeycomb body 2, first of all smooth and structured sheet-metal layers 3 and sheet-metal foils 1 with at least one sliding structure 4, which delimits a joining region 5 for the attachment of at least one adjacent sheet-metal layer 3 or sheet-metal foil 1, are produced. Then, an adhesive 17 (shown in FIG. 4) is applied in the joining region 5 which is delimited by the sliding structure 4. The sheet-metal layers 3 and sheet-metal foils 1 are then stacked and wound to form a honeycomb body 2. During the application of a brazing material 19 in powder form (shown in FIG. 4) to the honeycomb body 2, the brazing material 19 is fixed in the joining region 5 using the adhesive 17, and brazed joints between the sheet-metal layers 3 and sheet-metal foils 1 are produced through the use of subsequent heating of the honeycomb body 2.

In the illustrated embodiment of the honeycomb body 2, the sliding structures 4 of sheet-metal foils 1 disposed adjacent one another are disposed at the same distance 15 from an end side 16 of the honeycomb body 2. The distance 15 is defined in the direction of an axis 14. With a view toward a honeycomb body 2 of this type being used in an exhaust-gas purification system of an internal combustion engine, the exhaust gas which is to be purified preferably enters via that end side 16 in the vicinity of which the joining region 5, which is in disc form, is located. In this way, the maximum possible thermal and dynamic loads on the honeycomb body 2 in this area are compensated for particularly well. This also makes it possible for the downstream partial area of the honeycomb 2 to expand and/or contract substantially freely as a result of fluctuating thermal loads.

Figure 3:
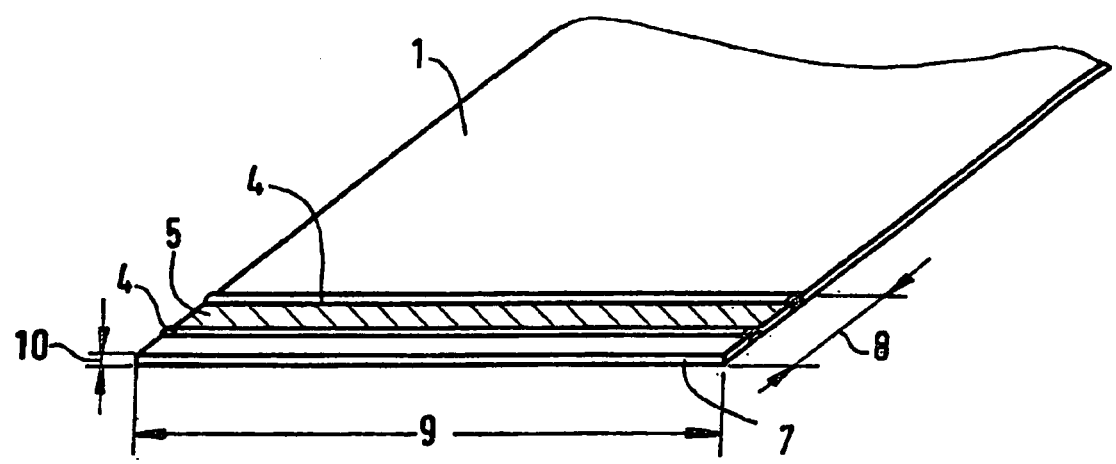
FIG. 3 is an enlarged, fragmentary, perspective view of a sheet-metal foil with sliding structures.

FIG. 3 shows a diagrammatic and perspective illustration of a sheet-metal foil 1 with two sliding structures 4 allowing adjacent sheet-metal layers 3 to slide over one another. The sheet-metal foil 1 is configured in such a way that the sliding structures 4 delimit the joining region 5 for attachment to the adjacent sheet-metal layer 3. In this case, the sliding structures 4 are disposed in the vicinity of an end side 7, preferably within a distance 15 of 5 to 10 mm from the end side 7. The sliding structures 4 in this case extend continuously over a width 9 of the sheet-metal foil 1 and are disposed approximately parallel to the end side 7.

A thickness 10 of the sheet-metal foil 1 is preferably selected to be less than 0.05 mm. A plurality of sheet-metal foils 1 of this type, following a subsequent stacking and/or winding operation, are combined, preferably helically, in an S-shape or in involute form, so as to form a honeycomb body 2.

Figure 4:
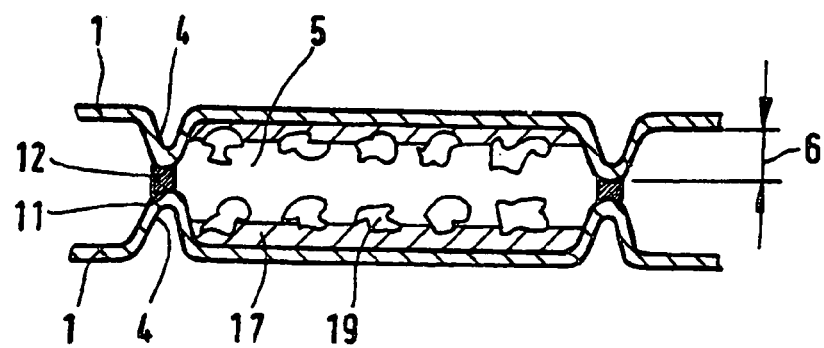
FIG. 4 is a further enlarged, fragmentary, sectional view of adjacent sheet-metal foils with sliding structures.
Figure 8:
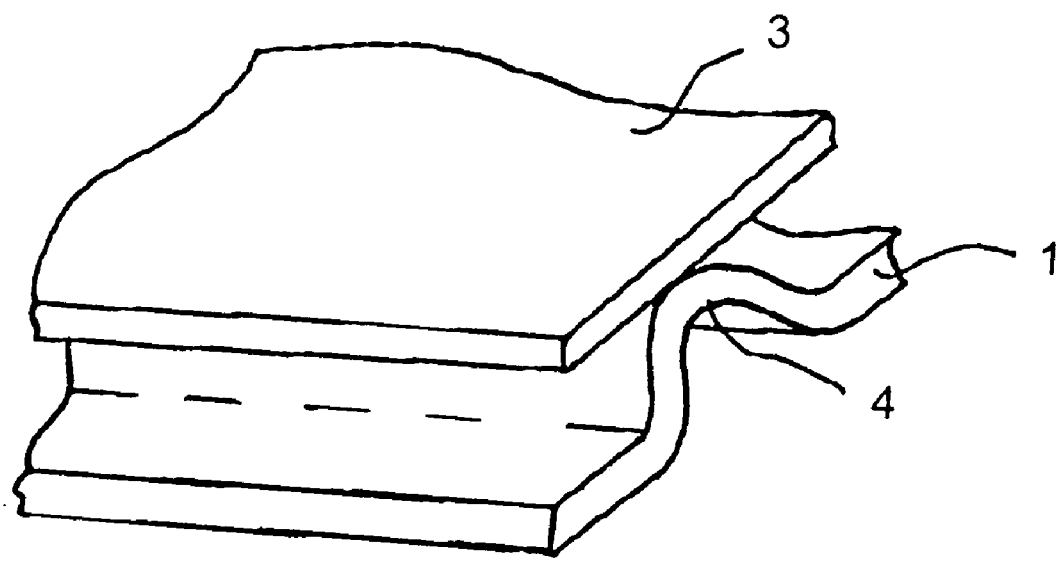
FIG. 8 is an enlarged, fragmentary, perspective view of a portion of a metallic honeycomb body illustrating sheet-metal layers and sheet-metal foils.

FIG. 4 shows a fragmentary, diagrammatic view of two adjacent sheet-metal foils 1. The sheet-metal foils 1 each have two sliding structures 4 with a sliding surface 11 and the sliding structures 4 are each directed so as to face one another. The result of this is that the sliding structures 4 of the sheet-metal foil 1 illustrated at the top are disposed on the sliding surfaces 11 of the sheet-metal foil 1 illustrated at the bottom. In order to reduce frictional forces while the adjacent sheet-metal foils 1 are sliding over one another, the sliding surfaces 11 are provided with a lubricant 12. FIG. 8 shows a portion of a sheet-metal foil 1 having a sliding structure 4 similar to that shown in FIG. 4, with a sheet-metal layer 3 disposed thereon.

The sliding structures 4 have a structure height 6 of at most 0.07 mm. In the embodiment of the sliding structures 4 which is illustrated, by way of example, a configuration of the sliding structures 4 with a structure height 6 of less than 0.03 mm is possible, since the structure heights 6 of adjacent sheet-metal foils 1 are cumulative in this configuration.

As mentioned above, the sliding structures 4 delimit the joining region 5. The sheet-metal foils 1 are provided with the adhesive layer 17 in this joining region 5. The brazing material 19 in powder form, which is subsequently supplied, sticks to the adhesive layer 17. In this case, the structure height 6 is to be selected in such a way as to prevent the adhesive 17 and/or grains of brazing material 19 from being stripped off. In this way, it is possible to produce very sharply defined joining regions 5.

Figure 5:
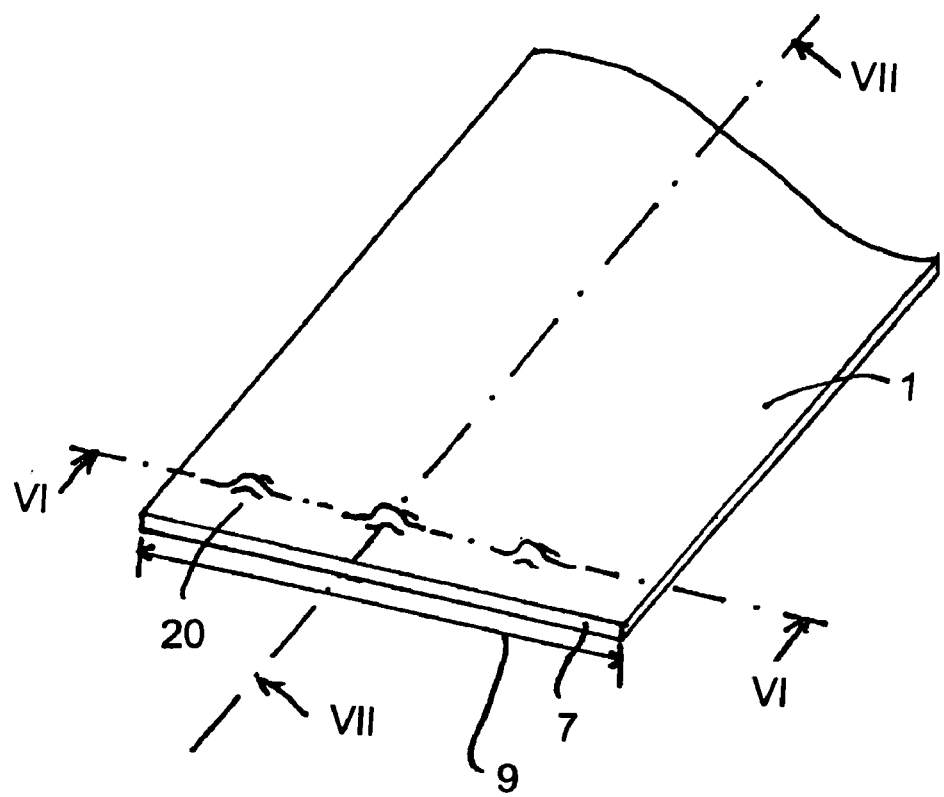
FIG. 5 is a fragmentary, perspective view of a further exemplary embodiment of a sheet-metal foil with sliding structures in stud form.

FIG. 5 shows a diagrammatic and perspective illustration of a further exemplary embodiment of a sheet-metal foil 1. Stud-shaped structures 20 are formed adjacent the end side 7, and parallel to this end side 7, as sliding structures on which adjacent sheet-metal layers can slide.

Figure 6:
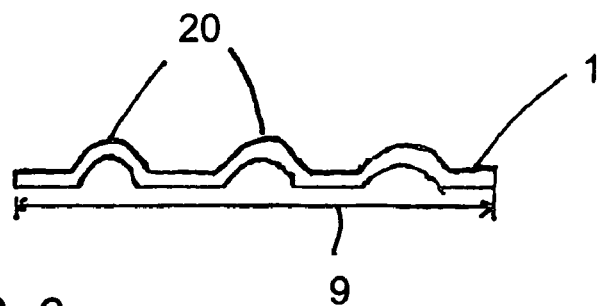
FIG. 6 is a sectional view taken along a line VI—VI of FIG. 5, in the direction of the arrows.
Figure 7:
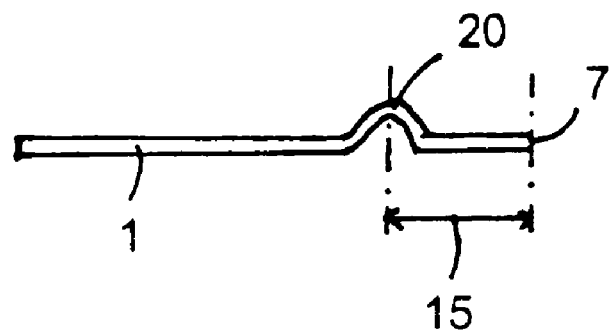
FIG. 7 is a sectional view taken along a line VII—VII of FIG. 5 in the direction of the arrows.

FIG. 6 shows a section through a sheet-metal foil 1, which is taken along a line VI—VI in FIG. 5. It can be seen that the stud-like structures 20 are not formed continuously over the width 9 of the sheet-metal foil 1. FIG. 7 shows a further section through the sheet-metal foil 1 which is taken along a line VII—VII in FIG. 5. It can be seen that the stud-like structures 20 are formed at a distance 15 from the end side 7 of the sheet-metal foil 1.

We claim:

1. A metallic honeycomb body assembly, comprising:
   a honeycomb body having sheet-metal layers, said sheet metal layers including corrugated and smooth sheet metal foils, said corrugated sheet metal foils having corrugations;

a plurality of said sheet-metal foils joined using a brazing material in powder form, said sheet-metal foils forming passages in said honeycomb body, each of said sheet-metal foils having:
at least one sliding structure in addition to said corrugations enabling adjacent said sheet-metal layers to slide over one another.

2. The assembly according to claim 1, wherein said at least one sliding structure delimits a joining region for attaching at least one adjacent sheet-metal layer.

3. The assembly according to claim 1, wherein said at least one sliding structure has a structure height of at most 0.07 mm.

4. The assembly according to claim 1, wherein said at least one sliding structure has a structure height of less than 0.05 mm.

5. The assembly according to claim 1, wherein the honeycomb body has an end side, and said at least one sliding structure is disposed close to said end side.

6. The assembly according to claim 1, wherein the honeycomb body has an end side, and said at least one sliding structure is disposed at a distance of approximately 10 mm from the end side.

7. The assembly according to claim 1, wherein the honeycomb body has an end side, and said at least one sliding structure is disposed at a distance of approximately 5 mm from the end side.

8. The assembly according to claim 1, wherein said at least one sliding structure extends continuously over a width of said sheet-metal foil.

9. The assembly according to claim 1, wherein the honeycomb body has an end side, and said at least one sliding structure extends continuously over a width of said sheet-metal foil, approximately parallel to the end side.

10. The assembly according to claim 1, wherein said at least one sliding structure is constructed as studs.

11. The assembly according to claim 1, wherein said sheet-metal foil has a thickness of at most 0.08 mm.

12. The assembly according to claim 1, wherein said sheet-metal foil has a thickness of less than 0.05 mm.

13. The assembly according to claim 1, wherein said sheet-metal foil and an adjacent sheet-metal layer are made from the same material, and said at least one sliding structure has a sliding surface with a coefficient of sliding friction of less than 0.15 relative to sliding against said adjacent sheet-metal layer.

14. The assembly according to claim 1, wherein said sheet-metal foil and an adjacent sheet-metal layer are made from the same material, and said at least one sliding structure has a sliding surface with a coefficient of sliding friction of less than 0.1 relative to sliding against said adjacent sheet-metal layer.

15. The assembly according to claim 1, wherein said at least one sliding structure has a sliding surface, and at least said sliding surface has a lubricant.

16. A honeycomb body, comprising:
at least partially structured sheet-metal layers being at least one of wound and stacked to form passages through which a fluid can flow, said sheet-metal layers being at least partially joined to one another by a brazing material in powder form; and
at least one sheet-metal toil with at least one sliding structure according to claim 1.

17. The honeycomb body according to claim 16, which further comprises a honeycomb body end face, said sliding structures of said sheet-metal toils disposed adjacent one another being disposed at the same axial distance from said end face.

18. The honeycomb body according to claim 16, wherein said sliding structures of each two directly adjacent sheet-metal foils face toward one another.

19. A honeycomb catalyst carrier body for an exhaust system of an internal combustion engine, the catalyst carrier body comprising:
at least partially structured sheet-metal layers being at least one of wound and stacked to form passages through which exhaust gas of the internal combustion engine can flow, said sheet-metal layers being at least partially joined to one another by a brazing material in powder form; and
at least one sheet-metal foil with at least one sliding structure according to claim 1.

20. A process for producing a honeycomb body, which comprises the following steps:
producing smooth and structured sheet-metal layers including corrugated and smooth sheet metal foils, said corrugated sheet metal foils having corrugations, the at least one sliding structure enabling adjacent sheet metal layers to slide over one another, said sheet-metal foils having at least one sliding structure in addition to said corrugations delimiting a joining region for attaching at least one adjacent sheet-metal layer and/or sheet-metal foil, the at least one sliding structure enabling adjacent sheet metal layers to slide over one another;
applying an adhesive in the joining region delimited by the sliding structure;
at least one of stacking and winding the sheet-metal layers and/or sheet-metal foils to form passages in the honeycomb body;
brazing the honeycomb body using a brazing material in powder form being fixed in the joining region by the adhesive; and
heating the honeycomb body to produce brazed joints between the sheet-metal layers and/or sheet-metal foils.

21. A process for producing a honeycomb body, which comprises the following steps:
producing smooth and structured metal sheets in the form of at least one of layers and toils having corrugations and at least one sliding structure in addition to said corrugations delimiting a joining region for attaching at least one adjacent metal sheet, "the at least one sliding structure enabling adjacent metal sheet layers to slide over one another"
applying an adhesive in the joining region delimited by the sliding structure;
at least one of stacking and winding the metal sheets to form passages in the honeycomb body;
brazing the honeycomb body using a brazing material in powder form being fixed in the joining region by the adhesive; and
heating the honeycomb body to produce brazed joints between the metal sheets.

* * * * *